(12) United States Patent
Doll et al.

(10) Patent No.: US 12,090,507 B2
(45) Date of Patent: Sep. 17, 2024

(54) METHOD FOR APPLYING AN INSULATION LAYER TO A MOTOR VEHICLE BATTERY CELL

(71) Applicant: IPR—Intelligente Peripherien für Roboter GmbH, Eppingen (DE)

(72) Inventors: Fredy Doll, Achern (DE); Bernhard Woll, Erdmannhausen (DE)

(73) Assignee: IPR—INTELLIGENTE PERIPHERIEN FÜR ROBOTER GMBH, Eppingen (DE)

( * ) Notice: Subject to any disclaimer, the term of this patent is extended or adjusted under 35 U.S.C. 154(b) by 393 days.

(21) Appl. No.: 17/430,101

(22) PCT Filed: Jan. 16, 2020

(86) PCT No.: PCT/EP2020/051052
§ 371 (c)(1),
(2) Date: Aug. 11, 2021

(87) PCT Pub. No.: WO2020/164848
PCT Pub. Date: Aug. 20, 2020

(65) Prior Publication Data
US 2022/0143645 A1    May 12, 2022

(30) Foreign Application Priority Data
Feb. 12, 2019    (EP) .................................... 19156664

(51) Int. Cl.
*B05C 11/10*    (2006.01)
*B05B 1/08*    (2006.01)
(Continued)

(52) U.S. Cl.
CPC .......... *B05C 11/1034* (2013.01); *B05B 1/083* (2013.01); *B05B 9/002* (2013.01);
(Continued)

(58) Field of Classification Search
CPC ..... B05C 11/1034; B05B 1/083; B05B 9/002; B05B 9/0423
See application file for complete search history.

(56) References Cited

U.S. PATENT DOCUMENTS 5,750,207 A * 5/1998 Hammond .......... C23C 14/0036
427/430.1
6,066,412 A    5/2000 Schirr et al.
(Continued)

FOREIGN PATENT DOCUMENTS

CN    102569680 A  *  7/2012  ............. H01M 2/02
CN    104115301 A     10/2014
(Continued)

OTHER PUBLICATIONS

Sun, Xiaomei, et al., "Effects of thermal insulation layer material on thermal runaway of energy storage lithium battery pack". Journal of Energy Storage 76 (2024) 109812, pp. 1-12.*
(Continued)

*Primary Examiner* — Bret P Chen
(74) *Attorney, Agent, or Firm* — FLYNN THIEL, P.C.

(57) ABSTRACT

Due to the dynamic mechanical loads to which motor vehicle traction batteries are subjected, housings of battery cells of the traction batteries are covered at least in part by an electrically insulating layer made from a coating material. For this purpose, a method and a coating station for carrying out the method are proposed. The method is performed with a liquid electrically insulating coating material, by applying separately produced individual drops of the coating material using a coating applicator. The drops form coating points on an outer surface of the housing, which coating points are applied sequentially with the coating applicator, adjacently to one another or overlapping, so that together they form coating lines.

10 Claims, 5 Drawing Sheets

(51) Int. Cl.
  *B05B 9/00* (2006.01)
  *B05B 9/04* (2006.01)
  *B05B 13/04* (2006.01)
  *B05C 5/02* (2006.01)
  *B05C 9/04* (2006.01)
  *B05D 1/26* (2006.01)
  *B05D 3/06* (2006.01)
  *H01M 50/103* (2021.01)
  *H01M 50/119* (2021.01)
  *H01M 50/124* (2021.01)
  *H01M 50/133* (2021.01)
  *H01M 50/24* (2021.01)

(52) U.S. Cl.
  CPC ........ *B05B 9/0423* (2013.01); *B05B 13/0431* (2013.01); *B05C 5/0216* (2013.01); *B05C 9/04* (2013.01); *B05D 1/26* (2013.01); *B05D 3/067* (2013.01); *H01M 50/103* (2021.01); *H01M 50/119* (2021.01); *H01M 50/124* (2021.01); *H01M 50/1245* (2021.01); *H01M 50/133* (2021.01); *H01M 50/24* (2021.01); *B05D 2202/25* (2013.01); *B05D 2502/00* (2013.01)

(56) References Cited

U.S. PATENT DOCUMENTS

| | | | | |
|---|---|---|---|---|
| 2009/0269657 A1* | 10/2009 | Mita | ..................... | H01M 50/24 413/18 |
| 2010/0216004 A1* | 8/2010 | Yoon | ................... | H01M 10/625 429/120 |
| 2014/0212738 A1* | 7/2014 | Wohrle | ............... | H01M 50/103 429/176 |
| 2014/0322588 A1* | 10/2014 | Duernegger | ........ | H01M 50/124 429/149 |
| 2015/0015210 A1* | 1/2015 | Bradwell | .................. | H02J 7/00 429/103 |
| 2016/0329534 A1 | 11/2016 | Flynn et al. | | |
| 2016/0365612 A1* | 12/2016 | Bradwell | ............ | H01M 10/615 |
| 2019/0088910 A1* | 3/2019 | Kiemstedt | ........... | H01M 50/267 |
| 2019/0252656 A1 | 8/2019 | Doll | | |
| 2023/0099554 A1* | 3/2023 | Jo | ....................... | H01M 50/289 429/433 |

FOREIGN PATENT DOCUMENTS

| | | | | |
|---|---|---|---|---|
| DE | 102013206283 A1 * | 10/2014 | ......... | H01M 8/0028 |
| DE | 102015205481 A1 | 9/2016 | | |
| EP | 0837514 A1 | 4/1998 | | |
| JP | 2010-194399 A | 9/2010 | | |
| WO | 2018/082989 A1 | 5/2018 | | |
| WO | WO 2019/002192 A1 * | 1/2019 | ............. | H01M 2/10 |

OTHER PUBLICATIONS

Nambisan, Praveen, et al., "Characterization of commercial thermal barrier materials to prevent thermal runaway propagation in large format lithium-ion cells". Journal of Energy Storage, vol. 74, Part B, Dec. 25, 2023, 109414, pp. 1-15.*

Wu, Hui, et al., "Improving battery safety by early detection of internal shorting with a bifunctional separator". Nature Communications, 5:5193, Oct. 2014, pp. 1-6.*

Brian Derby, "Inkjet Printing of Functional and Structural Materials: Fluid Property Requirements, Feature Stability, and Resolution", The Annual Review of Materials Research, vol. 40, Mar. 9, 2010, pp. 395-414 (22 pages).

International Search Report, with English translation, issued in corresponding International Application No. PCT/EP2020/051052 date of mailing Mar. 19, 2020 (7 pages).

Written Opinion of International Searching Authority issued in corresponding International Application No. PCT/EP2020/051052 dated Mar. 19, 2020 (6 pages).

Chinese Office Action with partial English translation issued in corresponding Chinese Application No. 202080014015.7, dated Nov. 18, 2022 (10 pages).

* cited by examiner

METHOD FOR APPLYING AN INSULATION LAYER TO A MOTOR VEHICLE BATTERY CELL

AREA OF APPLICATION AND PRIOR ART

The invention relates to the area of the coating of battery cells, in particular the coating of motor vehicle battery cells, a plurality of which are joined together to form a motor vehicle battery. In order in the case of such a motor vehicle battery to avoid damage to one battery cell affecting adjacent battery cells or adjacent batteries, it is known to provide the battery cells with an electrically insulating coating. This is described for example in WO 2018/082989 A1.

It is also already known from DE 102015205481 A1 to coat battery cells individually and to use for this a lacquer that is curable under UV light.

Until now, the liquid coating material has usually been applied to the surfaces of the housing of the battery cell in the form of an atomized spray jet. When applying the coating in this way, the effort required has been found to be problematic, involving as it does, in a way similar to a motor vehicle painting installation, laboriously screening off the coating area and also expending great effort in cleaning the installations because of an escaping mist of powder droplets. The loss of liquid coating material that escapes unused is also disadvantageous from ecological and economic aspects.

Problem and Solution

The problem addressed by the invention is that of providing a method and a coating station and a coating installation based on this method that reduce the disadvantages of the prior art.

Proposed for this is a method for applying an external insulation layer to the housing of a battery cell, in which the coating takes place with a liquid electrically insulating coating material and use of a coating applicator, by applying discretely produced single drops of the coating material. In this case, when they hit an outer surface of the housing, the single drops form coating points, which are applied sequentially adjoining or overlapping one another by means of the coating applicator, so that together they form coating lines.

The method according to the invention, which is related to the way in which an inkjet printer operates, is based on the fact that no undefined mist or spray jet and no continuous stream of material is used, but instead the liquid coating material is discharged sequentially in the form of individual single drops with a defined uniform discharging direction. These single drops are discharged while there is a relative movement of the applicator used with respect to the outer surface of the preferably prismatic battery cell housing, and form a trace of coating points arranged flush with one another or overlapping, and consequently a coating line.

With suitable adaptation of the discharging parameters, accuracy of the relative movement and consistent material properties, this coating line can be applied exactly where intended to the usually planar and rectangular outer surfaces up to the border, without coating material being discharged past the respective surface and soiling the production area to any appreciable extent.

The alignment of the applicator, and consequently the delivery direction of the single drops, is preferably in the direction of the normal vector of the surface to be coated. In the case of edges between outer surfaces that are angled with respect to one another, it may however also be expedient to allow the delivery of the single drops to take place at an angle to such edges that lies between the normal angles of the respectively adjacent outer surfaces.

The coating material is a liquid coating material, which in the cured state has an electrically insulating effect. Preferably, it comprises at least one component that cures under radiation, in particular under UV radiation. Alternatively, it may comprise a component that cures by polyaddition or polycondensation. The coating material may also comprise a component which both cures by polyaddition or polycondensation and requires radiation for curing.

In the case of a coating material with a component that cures under radiation, UV radiation in particular, but possibly also electron radiation, comes into consideration as radiation for curing purposes. The component curing under radiation is preferably at least one acrylate, at least one epoxy or at least one enol ether. The at least one acrylate is particularly preferred as the component curing under radiation. It may be preferred that, in addition to the component curing under radiation, the coating agent comprises a solvent component. The solvent is to be made compatible with the component curing under radiation. In preferred embodiments, the component curing under radiation comprises at least one reactive thinner, possibly in addition to the solvent component, but particularly preferably also as a substitute for the solvent component. As is known, a reactive thinner is understood as meaning a substance that reduces the viscosity of a coating material for processing and in the subsequent curing of the lacquer becomes part of the lacquer, usually as a result of copolymerization. By contrast with this, a customary solvent does not take part in chemical reactions and must generally be removed after completion of a reaction. If the component curing under radiation comprises an acrylate, then for example dipropylene glycol diacrylate, tripropylene glycol diacrylate, tetrahydrofurfuryl acrylate, isobornyl acrylate, isodecyl acrylate, ethylene ethyl acrylate, hexanediol diacrylate, tricyclodecane dimethanol diacrylate, propoxylated neopentyl glycol diacrylate and propoxylated trimethylolpropane triacrylate are suitable as reactive thinners. For example, the coating material may comprise a combination of isobornyl acrylate and tricyclodecane dimethanol diacrylate. In some particularly preferred embodiments, the coating material comprises the at least one reactive thinner not in addition to the at least one acrylate but as the at least one acrylate. In other words, the coating material then comprises essentially only one or more reactive thinners as radiation-crosslinkable constituents. Apart from the constituents mentioned, the coating material may comprise at least one additive, in particular a photoinitiator, for example a suitable phosphine oxide.

In the case of a coating material with a component curing by polyaddition or polycondensation, no radiation is required for the curing, but for instance the curing may in an individual case be initiated or promoted by heating. Coming into consideration in particular as such a component is a hydroxy-functional component with an isocyanate-functional curing agent, that is to say a component that can be used for producing polyurethanes. The hydroxy-functional component is usually a polyol, in particular selected from the group comprising polyester polyol, polyether polyol and acrylate polyol. The curing agent is for example m-tolylidene diisocyanate or isophorone diisocyanate.

Coating materials with a component which both cures by polyaddition or polycondensation and requires radiation for curing are known as dual-cure coating agents. For curing, they are generally heated and irradiated. Well suited for this are for example urethane acrylates, which can enter into a polyaddition reaction with a curing agent such as isophorone diisocyanate. They are subsequently finally cured by radiation.

Since the coating materials that come into consideration for the method according to the invention usually have a high viscosity at room temperature, which is unfavorable for the proposed type of delivery, it is therefore regarded as preferred if, before being discharged, the coating material is heated to a temperature of between 35° C. and 45° C., preferably by means of a heating device provided in the coating applicator.

Preferably, not only are coating lines joined together from coating points applied to the outer surface by means of the method, but a coating over a surface area is also made possible, in that a multiplicity of coating lines are applied sequentially next to one another and consequently form a contiguous coating surface. However, it is also possible in principle to coat relatively large surface areas of the housing by conventional means and only to provide particular regions such as edge regions with coating lines in the way provided by the method according to the invention.

For the coating of relatively large surface areas by means of single points, a number of coating lines are applied next to one another in an overlapping or adjoining manner. In this case, it is usually of advantage if the individual coating lines are aligned parallel to the longest extent of the surface area respectively to be coated, since in this way the shortest coating time can be achieved.

Depending on the type of positioning of the housing to be coated, the surface to be coated is usually aligned horizontally or vertically. In the case of a vertically aligned surface area, the coating over a surface area may take place by means of horizontal coating lines, while these are preferably applied one after the other from the top downward. It has been found that, as a result, a more uniform coating thickness as compared with application from the bottom upward, and consequently a higher coating quality, can be achieved than in the case of coating from the bottom upward. Alternatively, in the case of a vertical alignment of the surface to be coated, it may be provided that the coating lines are applied in a vertically aligned manner.

Usually, a number of outer surfaces of a housing are to be coated, usually altogether five sides, so that only an upper side, on which pole elements are provided, remains uncoated. In order to make this possible in as short a time as possible, it is preferably provided that the coating of two outer surfaces lying opposite one another takes place at the same time by means of two coating applicators.

The use of two applicators halves the coating time for the surface areas concerned. The effort involved in handling two such applicators is comparatively low, since the movement of the two applicators, or in principle even more than two applicators, is possible with just one displacement system, in particular just one robot.

The housing is preferably held during the coating by a workpiece holder. This holder may be designed in particular in such a way that it grips the battery cell by means of holding elements at the pole elements. A coating is usually not desired here. Apart from fixing the battery cell, the workpiece holders at the pole elements also have the effect of providing additional protection of the pole elements from splashes of the coating fluid.

It may be provided in the case of the method according to the invention that the relative displacement of the applicator with respect to the housing is based only or also on a displacement of the housing during the processing. For this, the workpiece holder may be designed in particular as rotatable about a vertical axis with respect to a fixed base or a feeding system such as a round table.

In the case of the method according to the invention, the discharge takes place by means of a coating applicator, which has a nozzle chamber and a nozzle opening, adjoining the nozzle chamber downstream, and also a displaceable plunger, which periodically enters the nozzle chamber along its longitudinal axis and thereby forces the content thereof through the nozzle opening as discrete single drops. Suitable coating applicators are available for example from the company Vermes Microdispensing GmbH of Otterfing, Germany.

The said plunger, which is set in periodic motions, preferably by means of piezo actuators, in particular piezo stacks, preferably moves during the discharge with a frequency of between 100 Hz and 1000 Hz, preferably between 200 Hz and 400 Hz. In the case of an applicator with a nozzle opening, these values consequently apply at the same time to the number of single drops that are delivered and leave behind individual coating points on a surface.

Even if a coating applicator for use in the case of the method according to the invention typically has only one nozzle opening, also possible are designs with a number of nozzle openings aligned in the same direction, so that they can apply a number of parallel coating lines simultaneously to the same surface. In such a case, the coating applicator may have separate plungers, which are in particular driven by separate piezo stacks. It is however also conceivable that a number of plungers form a common plunger unit, which is driven by means of common piezo stacks and, as a result, the plungers of which enter different, separately fed nozzle chambers.

As an alternative to the use of a plunger, it is also possible in principle that, in a way similar to the bubblejet technology known in the area of inkjet printing, the delivery of the coating material is brought about by heating elements, which produce a vapor bubble and thereby drive the coating material out of the nozzle chamber.

The coating preferably takes place with single drops, which have a drop volume of between 0.2 mm$^3$ and 1.0 mm$^3$. The specific drop size is influenced in particular by the stroke of the periodically moved plunger. The coating points occurring preferably have at their thickest point a thickness of between 50 µm and 100 µm, while they are preferably arranged in an overlapping manner to form coating lines or coating surfaces in such a way that an average layer thickness of between 60 µm and 120 µm is obtained. The diameter of the individual coating points preferably lies between 1 mm and 2 mm.

The coating preferably takes place through a nozzle opening with a nozzle diameter of between 0.2 mm and 0.8 mm, preferably of 0.5 mm. The coating also preferably takes place with a distance between the nozzle opening and the outer surface to be coated of between 3 mm and 8 mm, preferably between 4 mm and 6 mm.

The feeding of the coating material into the nozzle chamber preferably takes place with a pressure of between 3 and 5 bar. A pressure that is too low, and similarly a return movement of the plunger that is too quick, tends to cause air to be sucked in when the plunger moves out of the nozzle chamber, and so a feeding pressure in the stated range is preferred. If the pressure is chosen too high, it may happen that the single drop is broken up when it is delivered and the coating becomes inhomogeneous.

The relative speed between the coating applicator and an outer surface during the delivery of the coating material is obtained from the stated parameters and is preferably between 300 mm/sec and 700 mm/sec.

Apart from the method described, the invention also relates to a coating station for applying an external insulation layer to the housing of a battery cell. For this, the coating station has at least one automatically movable coating applicator, which is designed for delivering the coating material in the form of discrete single drops. Furthermore, the coating station has a workpiece holder for fixing the battery cell. The coating station is designed for carrying out the method described above.

The coating station is designed with the described components for coating a housing of a battery cell on at least one side. The coating station may be designed for coating all sides. Preferably, however, it is used in connection with a second processing station, and so each processing station can be assigned a specific surface area or specific surface areas of the housing.

Preferably, the coating station according to the invention is equipped with a robot, on the robot arm of which the coating applicator of the type already described above is provided. It is achieved in this way that the housing can remain in a fixed position in relation to the robot or the base thereof during the coating. It may also be provided that the housing itself is moved with respect to the robot, in particular is rotated about a vertical axis, during the coating.

As already explained above, it is of advantage in terms of rapid processing if the coating takes place on opposite sides of the housing at the same time by means of two coating applicators. For this purpose, the coating station has in a preferred design the two coating applicators mentioned, which for moving together are provided on a common displacement system, in particular on a common robot arm. The two coating applicators are in this case preferably provided with nozzle openings facing one another on a common carrier.

In the case of a simple design, the two coating applicators are fastened in a fixed relative position on the common carrier. Their relative position is not changed during the automated coating, but can be adapted by changing the distance during the setting up of the coating station.

It may however also be provided that at least one of the coating applicators is movable in a motorized manner in relation to the other coating applicator, in particular can be moved linearly in the delivery direction. This allows the distance to be adapted to the housing to be coated without additional setting-up times.

The coating station according to the invention usually has a storage reservoir for coating material, from which the at least one coating applicator is fed with liquid coating material. In this case, it is regarded as particularly advantageous if the coating station comprises at least one annular channel, which is connected to the storage reservoir at two points, so that coating material can be removed into the annular channel and fed back to the storage reservoir from the annular channel. This annular channel subjects the coating material to shearing, whereby the viscosity of the coating material can be lowered. This is of advantage in order to be able to discharge the material by a described coating applicator.

The annular channel is also preferably connected to a supply channel, through which the coating material can be conducted to the coating applicator. Arranged in the supply channel or preferably in the annular channel is a pump, in particular preferably a diaphragm pump, which builds up a feed pressure, with which the coating material is fed to the coating applicator. Preferably, this feed pressure lies at approximately 4 bar.

The storage reservoir is preferably also assigned a stirring mechanism, which stirs the coating material for the purpose of avoiding sedimentation. Furthermore, the storage reservoir preferably has a heating device, which heats the coating material in the storage reservoir in order to lower the viscosity.

It has been found that the coating materials that are particularly well-suited for the coating require very consistent ambient parameters in order to bring about a reproducible discharge. If coating material remains in the supply channel in the state of rest of the coating station, it usually can no longer be used for coating, since its viscosity changes and sedimentation can occur. Preferably, the coating applicator therefore has a flushing device, by means of which coating material can be flushed out of the nozzle chamber of the coating applicator and/or out of the supply channel that connects the nozzle chamber to the storage reservoir or the annular channel.

The invention also relates furthermore to a coating installation for applying an external insulation layer to the housing of a battery cell. This coating installation has at least a first and a second coating station of the type described. These coating stations are designed for carrying out in each case the described method, the coating stations being designed for coating different outer surfaces of the same housing. In addition, a coating installation according to the invention has a feeding system, which is designed for supplying the coating stations with housings to be coated and/or for displacing a housing to be coated from the first coating station to the second coating station.

Regarded as particularly advantageous is a design in which the feeding system has a round table which can be rotated about a vertical axis and on which the housings, which are preferably fixed by means of workpiece holders, are moved between the at least two coating stations.

In addition to the two coating stations, there may be further coating stations. The drying, in particular by means of UV light, also preferably takes place at a separate station, which is in particular also arranged on the round table. Furthermore, the quality control by means of a measuring station for layer thickness measurement may also follow after this.

The workpiece holders by means of which the workpieces are fixed on the round table may be designed as rotatable in a motorized manner for the purpose of coating, drying or layer thickness measurement.

BRIEF DESCRIPTION OF THE DRAWINGS

Further advantages and aspects of the invention emerge from the claims and from the following description of preferred exemplary embodiments of the invention, which are explained below on the basis of the figures.

DETAILED DESCRIPTION OF EXEMPLARY EMBODIMENTS

Figure 1:
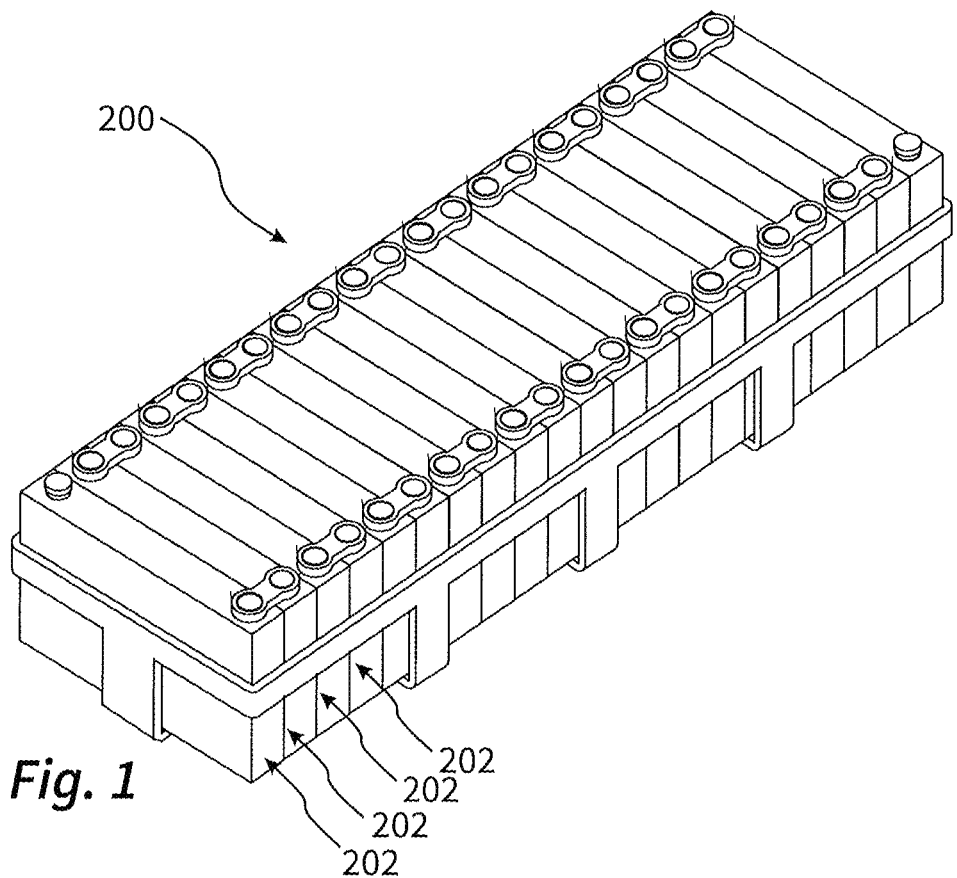
FIGS. 1 to 3 show a motor vehicle battery and a single cell of this motor vehicle battery and its housing.

FIG. 1 shows a motor vehicle battery 200. This battery comprises a multiplicity of battery cells 202, which have in each case a prismatic housing. The battery cells 202 lie flush against one another with outer surfaces 210A of their respective housings 204.

Figure 2:
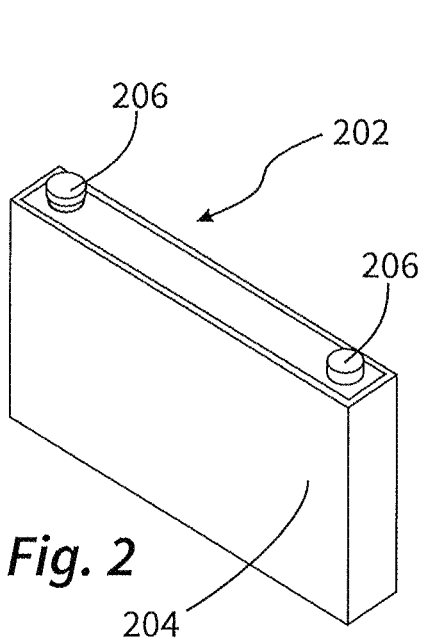
Figure 3:
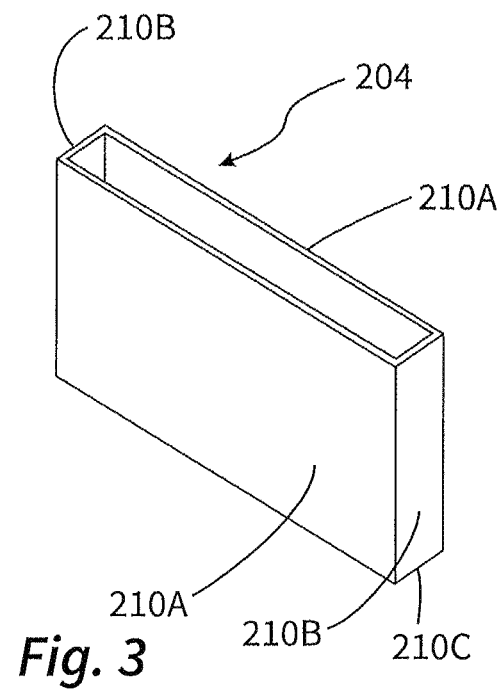

In order in the event of damage to one battery cell 202 to prevent the damage from affecting other battery cells, it is provided that the outer surfaces 210A, 210B, 210C of the housings 204 are in each case provided with an insulation layer of a cured coating material. This coating may take place after completed assembly of the battery cell, and consequently in the state of FIG. 2. Alternatively, however, the coating may also take place before assembly, so that at this time the housing 204 is still empty in the way represented in FIG. 3. The housing 204 to be coated is usually produced from aluminum or an aluminum alloy.

In particular if the battery cell 202 is already completely assembled, there is a great risk when coating by classical coating methods with sprayed coating material that, in addition to the outer surfaces 210A, 210B, 210C that are intended to be coated the pole elements 206 of the battery are also partially coated, which is not desired and leads to laborious subsequent work.

As provided by the method according to the invention, it is therefore envisaged that the coating takes place with a coating applicator that is designed for the specifically directed discharge of single drops.

Figure 4:
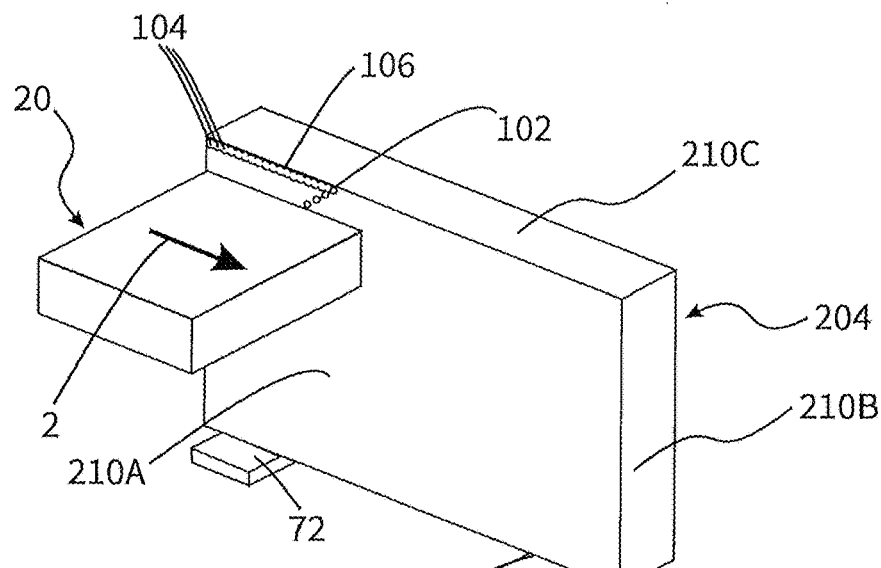
FIGS. 4 to 5 illustrate the coating method according to the invention for coating the housing by means of a coating applicator, which is designed for discharging discrete single drops.
Figure 5:
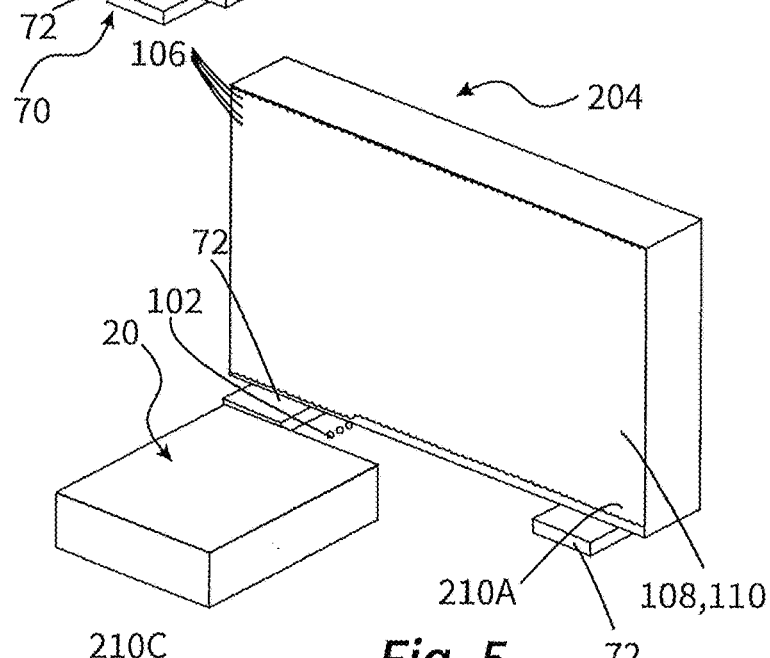

FIGS. 4 and 5 illustrate this method. The method provides that the battery cell 202 or at least its housing 204 is fixed by means of a workpiece holder 70 and holding elements 72 intended for grasping the pole elements 206. Subsequently, a coating applicator 20, which is explained in still more detail below, is positioned in the direct vicinity of the surface to be coated, in the case of the arrangement of FIG. 4 therefore directly in front of the outer surface 210A. The distance between a nozzle opening 24, not represented in FIG. 4, of the coating applicator 20 and the surface to be coated is preferably a few millimeters, in the present case approximately 5 mm.

Beginning from a starting position, the discharge then takes place, in that the coating applicator produces discrete single drops of less than 1 mm$^3$ in volume with high frequency, which are issued in a defined direction in the direction of the outer surface 210A and, when they hit the surface, form a coating point 104 of approximately 1 to 2 mm in diameter there. In this case, the entire volume of the coating material remains on the surface. If the operating parameters of the coating applicator are suitably chosen, a spray mist does not occur.

During or after the discharge of a single drop 102, and the consequent formation of a coating point on the outer surface 210A, the coating applicator 20 is displaced with respect to the outer surface 210A, as indicated by the arrow 2 and explained in still more detail below. During this movement, further discrete single drops 102 continue to be issued in the direction of the surface, the frequency, the size of the drops and the speed of the coating applicator 20 being made compatible with one another in such a way that the coating points 104 overlap, and thereby form a continuous coating line 106.

As can be seen from FIG. 5, a contiguous coating surface 108 is formed by further coating lines 106, which are applied overlapping with previous coating lines 106.

Figure 6:
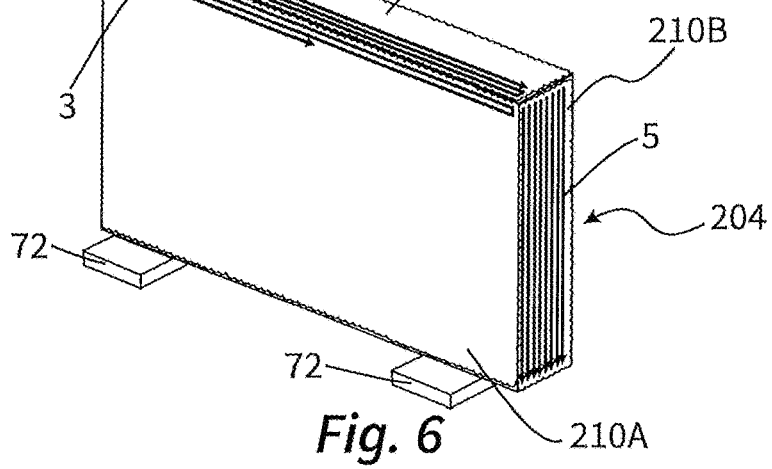
FIG. 6 shows possible paths of the coating applicator for coating the housing.

This procedure is repeated for all of the outer surfaces 210A, 210B, 210C to be coated, so that in the end the surfaces mentioned are in each case completely or partially covered by coating surfaces 108. FIG. 6 shows the housing 204 after completion of the coating.

Even if the quality of the coating as regards the uniformity of the layer thickness is greatest when the discharge takes place onto a horizontal surface, as is the case here with the outer surface 210C, it has been found that high quality can also be achieved on vertically aligned surfaces, as in the present case the outer surfaces 210A, 210B. This also depends however on the arrangement of the paths 3, 5 along which the coating applicator 20 is moved with respect to the housing 204. It applies in principle that it is of advantage if the individual coating lines are aligned parallel to the longest extent of the surface to be coated in each case. In the case of the outer surface 210A, the coating lies are therefore aligned horizontally, while in the case of the outer surface 210B they are aligned vertically. In particular when applying horizontal coating lines 106 to vertically aligned surfaces, that is to say in the present case the outer surfaces 210A, it has been found to be advantageous if the coating lines are placed one below the other from the top downward, as illustrated by the path 3.

Figure 7:
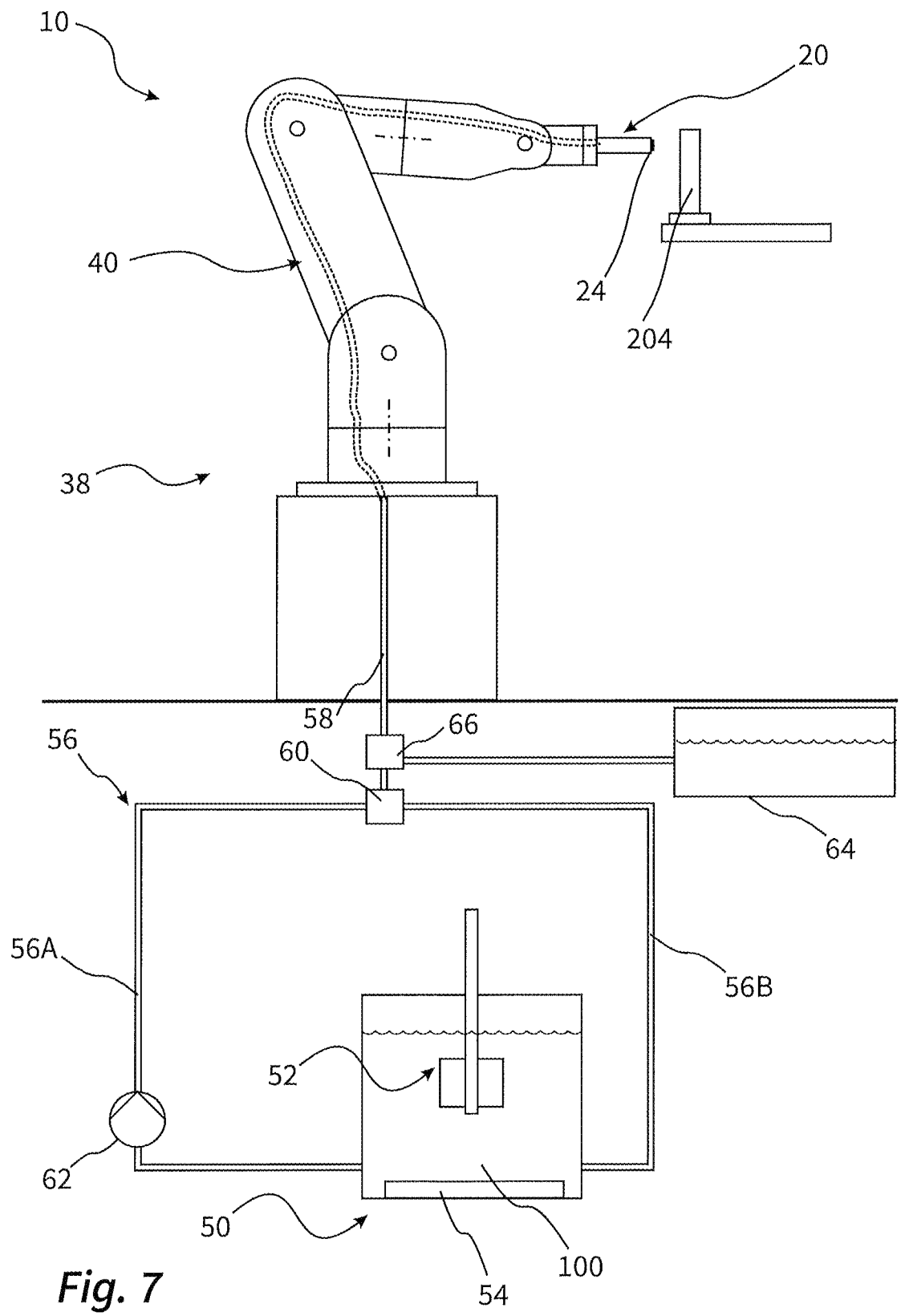
FIG. 7 shows a processing station for carrying out the coating method.

FIG. 7 shows the construction of a coating station, a robot 38 with a robot arm 40 being used in the present case in order to guide the coating applicator 20 provided at the distal end of the robot arm 40. The supplying of the coating applicator 20 with liquid coating material takes place from a storage reservoir 50, in which the coating material 100 is stored before being discharged. Since the coating materials that come into consideration in particular for the method according to the invention usually have quite a high viscosity at 20° C., the storage reservoir 50 is provided with a heating device 54, in order to keep the coating material at a higher temperature, in particular at a temperature of between 35° C. and 45° C. As an alternative or in addition, heating devices may also be provided in the channels leading to the coating applicator or in the coating applicator 20 itself. Since the coating materials that are suitable in particular for the invention also have a tendency to undergo sedimentation, that is to say the deposition of constituents, when the liquid coating material is at rest, the storage reservoir 50 additionally has a stirring mechanism, by means of which the coating material 100 is permanently homogenized.

Various channels are provided for supplying the coating applicator 20 from the storage reservoir 50. The storage reservoir 50 is provided with an annular channel 56, which has a feed-channel portion 56A and a return-channel portion 56B. The coating material 100 from the storage reservoir is sucked into the feed-channel portion 56A by means of a pump 62 during the coating procedure, but also during brief breaks in the coating procedure, for example when changing a workpiece. The pump 62 brings about a feed pressure of approximately 4 bar downstream.

Provided at the end of the feed-channel portion 56A is a three-way valve 60, by means of which it is controlled whether the coating material is fed through the return-channel portion 56B back into the storage reservoir 50 or through a supply channel 58 in the direction of the coating applicator 20.

The feeding of coating material 100 from the storage reservoir 50, which as far as possible is uninterrupted, serves in particular the purpose of ensuring a consistent quality of the coating material, even if the discharge from the coating applicator 20 pauses. The coating material 100 circulating in the circuit made up of the storage reservoir 50 and the annular channel 56 is subjected to shearing in the annular channel 56, as a result of which its viscosity falls. By contrast, in that part of the channels to the coating applicator 20 that is not part of the annular channel 56, the coating material 100 remains motionless when the coating applicator is deactivated. Depending on the type of coating material, this is usually uncritical for several minutes. If, however, the coating material 100 stays in the supply channel 58 for too long, there is an increase in viscosity and/or sedimentation, so that the coating material should no longer be used for the coating.

The system therefore has a flushing device, which comprises a flushing pump 66, which can feed cleaning fluid out of a flushing-agent tank 64 into the supply channel 58 in order to remove the coating material remaining therein out of the supply channel 58 through the coating applicator 20 or a separate outflow opening, so that subsequently fresh material can be fed out of the annular channel 56 to the supply channel 58.

Against this background, it is preferable to make the supply channel 58 as short as possible and to bring the annular channel 56 as close as possible to the coating applicator.

In the case of a preferred design of the coating method that is further explained below, a plurality of coating applicators are used. In such a case, it is regarded as preferred if they are connected to a common annular channel 56.

Figure 8:
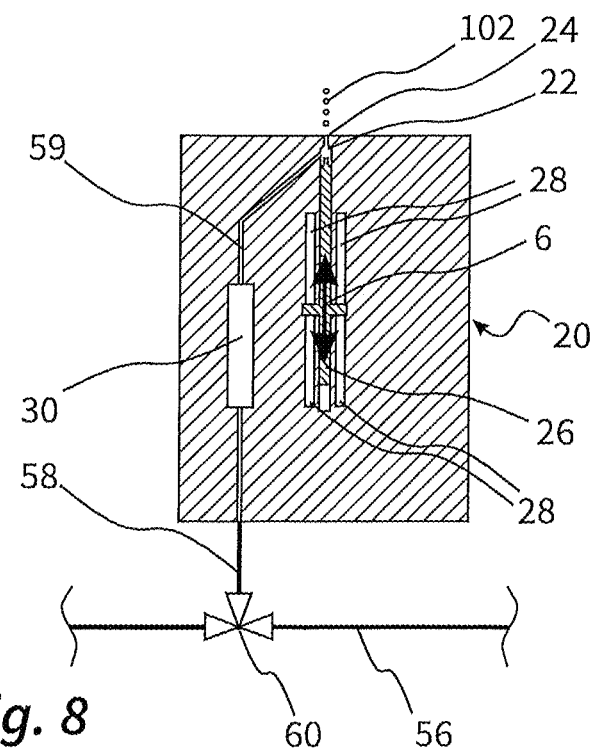
FIG. 8 shows the coating applicator used in a schematic representation.

FIG. 8 shows a coating applicator 20 in a schematic and sectional representation. It can be seen that the end 59 of the supply channel 58 runs within the coating applicator 20, a further heating device 30 being provided here in order to ensure a particularly uniform temperature, in particular of between 35° C. and 45° C., during the subsequent discharge of the coating material. The supply channel 58 opens out into a nozzle chamber 22, which is adjoined by a nozzle opening 24. The discharge of the coating material in the form of discrete single drops 102 is brought about by a plunger 26, which can be moved by piezo stacks 28 back and forth in the direction of the arrow 6. The plunger is usually operated with a frequency of between 100 Hz and 1000 Hz. If the plunger is withdrawn from the nozzle chamber 22, coating material 100 flows in from the supply channel 58 and, after the subsequent movement of the plunger 26 in the direction of the nozzle chamber 22, is forced through the nozzle opening to the outside and thereby forms a discrete single drop.

It has been found to be advantageous if the speed of the plunger during withdrawing movements is comparatively low, since otherwise there is the risk that ambient air is sucked into the nozzle chamber 22 through the nozzle opening 24 and disturbs the formation of drops during the subsequent discharge and/or leads to air inclusions in the single drop 102 and subsequently in the coating point 104. This can in principle be counteracted by an increased pressure in the supply channel 58. However, if a pressure that is well above 4 bar is used here, there is the risk that the single drop 102 is broken up when it is discharged. It is therefore preferred that the speed is lower during the drawing movement than during the rapid forward movement of the plunger 26, preferably by a factor of at least 2.

Figure 9:
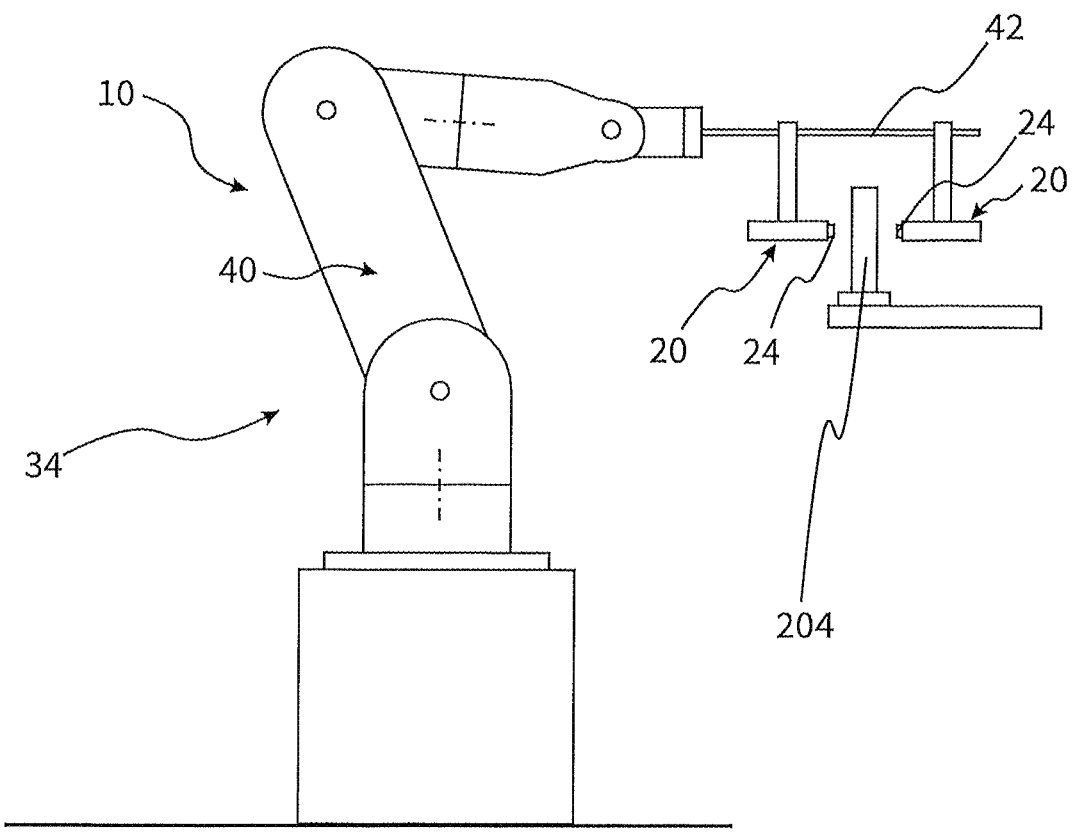
FIGS. 9 and 10 show a processing station and the coating procedure with the simultaneous use of two applicators.
Figure 10:
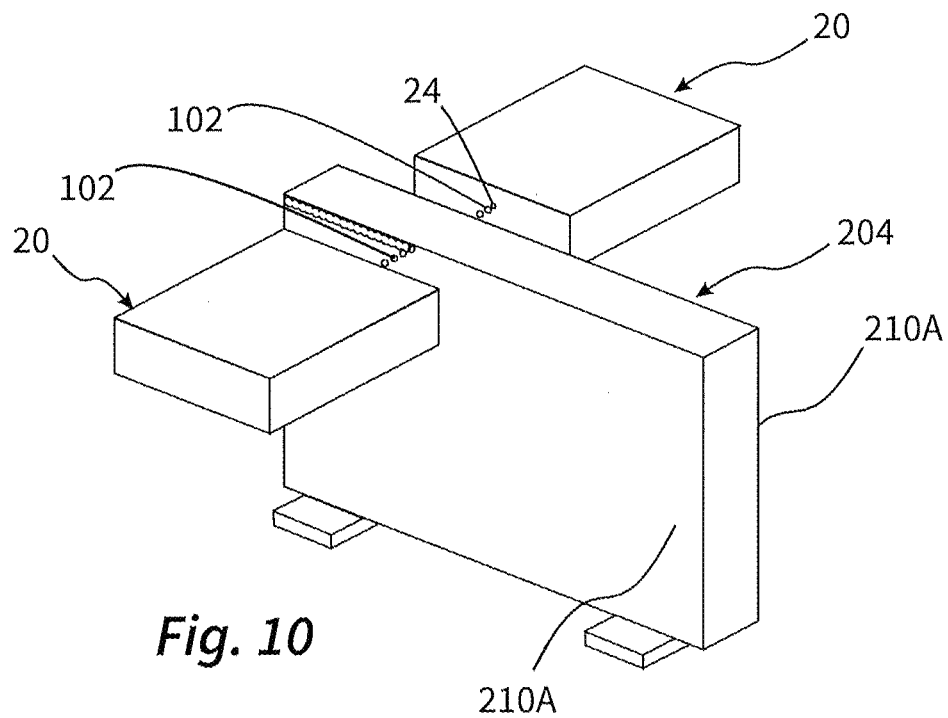

FIGS. 9 and 10 show a supplemented variant of the method. This is distinguished by the fact that a plurality of coating applicators 20, preferably precisely two coating applications, are guided together, in the present case by a common robot arm 40. The two coating applicators 20 are attached to a common carrier 42 and are aligned with their nozzle openings 24 facing one another, so that they can simultaneously coat two opposite sides of the housing 204. As a result, shorter cycle times can be achieved.

In the case of a very simple variant of such a carrier 42 with two coating applicators 20, they are not automatically movable, but can be changed with regard to their distance only when setting up the station, in order to be adapted to different dimensions of housings 204. It is of advantage however if the distance is also variable while operation is in progress, in order in this way to ensure in each case a uniform distance between the nozzle openings 24 and the respective surfaces for example even when there are slight variations with respect to the dimensions of the housing or when the coating station is used for different types of housings 204. This uniform distance leads to a reproducible discharging behavior and in particular to precise maintenance of a desired overlapping of the coating points 104 and the coating lines 106.

In FIG. 10, the two coating applicators 20 can be seen in operation during simultaneous coating. By being attached to the common carrier 42, they are moved together during the coating, so that they apply the respective coating points 104 and coating lines 106 at the same time to the outer surfaces 210A of the housing 204.

Figure 11:
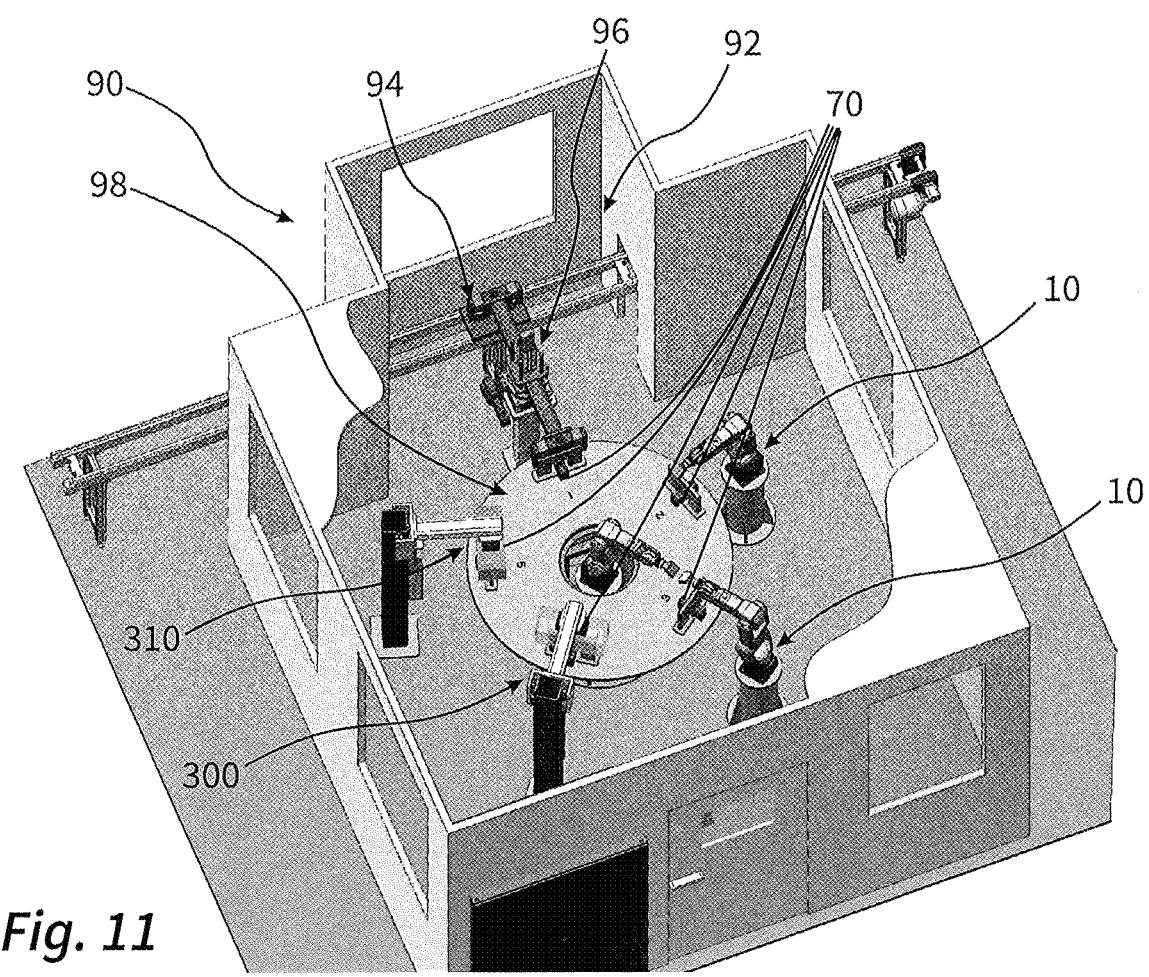
FIG. 11 shows a coating installation with a plurality of coating stations and further stations.

FIG. 11 shows a coating installation 90, which can be used in the industrial large-scale production of electric motor vehicles and by means of which housings 204 of battery cells 202 are coated in a multistage process.

The coating installation 90 has a central round table 98, which is rotatable about the vertical axis and has altogether five workpiece holders 70. Arranged around this round table 98 are two coating stations 10, which correspond essentially to those of FIG. 7 or 9. Furthermore, a drying station 300 and a measuring station 310 for measuring the layer thickness achieved are provided here. The rotary round table 98 is part of a feeding system 92, which also has a transporting robot 96, which removes battery cells 202 or housings 204 from a feed line 94 and positions them on one of the workpiece holders 70 of the round table 98. The transporting robot 96 may in this case be additionally designed for ascertaining after the positioning of the battery cell 202 or the housing 204 on the workpiece holder 70 its exact position, so that in particular the coating stations 10 can adapt their path parameters on the basis of the exact position of the battery cell 202 or the housing 204. Instead of a position detection integrated in the transporting robot 96, a separate device may also be provided for this between the transporting robot and the first coating station 10. Depending on the required accuracy and type of workpiece holders 70, it may also be possible to dispense with ascertaining the precise position.

The housing 204 positioned by the transporting robot 96 on the workpiece holder 70 and fixed there by means of the holding elements 72 is moved to the first coating station, and after coating there, on to the second coating station, by turning the round table 98 in a clockwise direction. The two coating stations apply coatings one after the other in the way described to various outer surfaces 210A, 210B, 210C. The number of coating stations can in this case be adapted according to the type of housings. Once the housing 204 has been provided with the coating on the outer surfaces 210A, 210B, 210C at the coating stations 10, a drying takes place at the drying station 300 by means of UV light. For this, the drying station 300 has a variable-height protective shroud, on the inner side of which corresponding UV light sources, particularly UV LEDs, are provided. After the infeeding of the housing 204 by means of the round table 98, the shroud is lowered, so that it surrounds the housing 204. After completion of the drying, the protective shroud is raised again.

This is followed by an examination at the measuring station 310 of the layer thickness achieved. The station also has a shroud for this purpose, on the inner side of which at least one measuring device for layer thickness measurement is provided, while preferably a plurality of measuring devices may be provided for recording the layer thickness at different measuring points. The measurement preferably takes place inductively.

Finally, the housing is moved by means of the round table 98 into the region of the transporting robot 96 again. There, the holding elements 72 of the workpiece holder 70 are released and the housing 204 or the battery cell 202 is transported back to the feed line 94, while at the same time a further housing 204 or a further battery cell is removed from the feed line 94 and is fed to the round table 98 for coating.

The invention claimed is:

1. A method for applying an external insulation layer to the housing of a battery cell, the method comprising:
    coating an outer surface of the housing with a liquid electrically insulating coating material;
    the step of coating includes using a coating applicator, and applying discretely produced single drops of the coating material, which single drops of the coating material form coating points on the outer surface of the housing; and
    applying the coating points in a sequentially adjoining or overlapping manner with one another with the coating applicator, so that together the coating points form coating lines.

2. The method as claimed in claim 1, wherein the step of coating includes applying a multiplicity of coating lines sequentially next to one another to form a contiguous coating surface over a surface area of the housing.

3. The method as claimed in claim 1, including coating two outer surfaces of the housing oriented opposite one another at the same time using two coating applicators.

4. The method as claimed in claim 1, including holding the housing during the step of coating with a workpiece holder having two holding elements, the holding elements fixing the battery cell in a region of pole elements of the battery cell.

5. The method as claimed in claim 1, including least one of the following steps:
    coating at least a planar outer surface of the housing while the planar outer surface is vertically oriented; and/or
    coating at least a planar outer surface of the housing while the outer surface is vertically oriented, and applying coating lines in a vertically aligned manner; and/or
    coating at least a planar outer surface of the housing while the planar outer surface is horizontally oriented and while the planar outer surface is oriented in an upwardly facing orientation.

6. The method as claimed in claim 1, including at least one of the following:
    the coating material comprises at least one component that cures under radiation; and/or
    the coating material comprises a component that cures by polyaddition or polycondensation; and/or
    the coating material comprises a component which both cures by polyaddition or polycondensation and requires radiation for curing.

7. The method as claimed in claim 1, further including discharging the liquid electrically insulating coating material with the coating applicator, the coating applicator having a nozzle chamber and a nozzle opening, the nozzle opening adjoining the nozzle chamber and being located downstream of the nozzle chamber, and a displaceable plunger, the displaceable plunger periodically entering the nozzle chamber along a longitudinal axis thereof and thereby forcing contents of the nozzle chamber through the nozzle opening as discrete single drops.

8. The method as claimed in claim 7, including moving the plunger with a frequency of between 100 Hz and 1000 Hz.

9. The method as claimed in claim 1 including at least one of the following:
    the step of coating takes place with single drops having a drop volume of between 0.2 mm$^3$ and 1.0 mm$^3$; and/or
    the coating points have a maximum thickness of between 50 μm and 100 μm and are arranged in an overlapping manner such that an average layer thickness of between 60 μm and 120 μm is obtained; and/or
    the coating points have a diameter of between 1 mm and 2 mm; and/or
    the coating takes place through a nozzle opening with a nozzle diameter of between 0.2 mm and 0.8 mm; and/or
    the coating takes place with a distance between the nozzle opening and the outer surface to be coated of between 3 mm and 8 mm; and/or
    feeding the coating material into the nozzle chamber with a pressure of between 3 bar and 5 bar; and/or
    a relative speed between the coating applicator and an outer surface of the housing during delivery of the coating material is between 300 mm/sec and 700 mm/sec; and/or
    before being discharged, the coating material is heated to a temperature of between 35° C. and 45° C.

10. The method as claimed in claim 1, including coating at least a planar outer surface of the housing while the planar outer surface is vertically oriented, and applying horizontal coating lines one after the other from a top of the housing downward.

* * * * *